US009346240B2

(12) United States Patent
Walther et al.

(10) Patent No.: US 9,346,240 B2
(45) Date of Patent: May 24, 2016

(54) OPEN-POROUS METAL FOAM BODY AND A METHOD FOR FABRICATING THE SAME

(71) Applicants: ALANTUM, Seongnam (KR); FRAUNHOFER-GESELLSCHAFT ZUR FÖRDERUNG DER ANGEWANDTEN FORSCHUNG E.V., München (DE)

(72) Inventors: Gunnar Walther, Dresden (DE); Burghardt Klöden, Dresden (DE); Juliane Böhm, Hänichen (DE); Tilo Büttner, OT Hetzdorf (DE); Thomas Weissgärber, Dresden (DE); Bernd Kieback, Possendorf (DE); Arne Boden, Dresden (DE); Hans-Dietrich Böhm, Dresden (DE); Hyuntae Kim, Seongnam (KR); James Choi, Seongnam (KR); Myungjoon Jang, Seongnam (KR); Alexander Böhm, Sauerlach (DE); Stefan Fröhlich, Sauerlach (DE); Winfried Dölling, Sauerlach (DE)

(73) Assignees: ALANTUM, Seongnam (KR); FRAUNHOFER GESELLSCHAFT ZUR FORDERUNG DER ANGEWANDTEN FORSCHUNG E.V., Munich (DE)

( * ) Notice: Subject to any disclaimer, the term of this patent is extended or adjusted under 35 U.S.C. 154(b) by 504 days.

(21) Appl. No.: 14/011,939
(22) Filed: Aug. 28, 2013
(65) Prior Publication Data
US 2014/0004259 A1 Jan. 2, 2014

Related U.S. Application Data

(62) Division of application No. 13/197,867, filed on Aug. 4, 2011, now abandoned.

(30) Foreign Application Priority Data

Aug. 10, 2010 (KR) .................. 10-2010-0077032

(51) Int. Cl.
| | |
|---|---|
| *B22F 3/11* | (2006.01) |
| *B32B 5/18* | (2006.01) |
| *C22C 38/06* | (2006.01) |
| *C22C 1/08* | (2006.01) |
| *C22C 33/02* | (2006.01) |
| *B22F 3/10* | (2006.01) |

(52) U.S. Cl.
CPC .............. *B32B 5/18* (2013.01); *B22F 3/1146* (2013.01); *C22C 1/08* (2013.01); *C22C 33/0285* (2013.01);

(Continued)

(58) Field of Classification Search
CPC .................................................... B22F 3/1146
See application file for complete search history.

(56) References Cited

U.S. PATENT DOCUMENTS 3,961,098 A * 6/1976 Bessen ............... C23C 4/18
427/191
4,155,755 A * 5/1979 Sara .................... B22F 3/114
148/514

(Continued)

FOREIGN PATENT DOCUMENTS

DE 102005010248 8/2006

OTHER PUBLICATIONS

Walther, et al., "A New Class of high Temperature and corrrosion Resistant Nickel-Based Open-Cell Foams", MetFoam 2007: Porous Metals and Metallic Foams, 125-132 (Sep. 2008).

*Primary Examiner* — George Wyszomierski
*Assistant Examiner* — Ngoclan T Mai
(74) *Attorney, Agent, or Firm* — Lex IP Meister, PLLC

(57) ABSTRACT

Disclosed are an open-porous metal foam and a method for manufacturing the same. An open-porous metal foam according to an exemplary embodiment of the present invention is made of an iron-based alloy including 15 wt % or more of chrome and 5 wt % or more of aluminum. The open-porous metal foam is a semi-product that is formed of iron or the iron-based alloy that does not include chrome and aluminum or includes a smaller amount of chrome and aluminum in the powder when manufacturing, and the surface and the open pore thereof are uniformly coated with the powder of the iron-chrome-aluminum alloy and the organic binding agent. When heat treatment is performed under a reduction atmosphere, sintering is performed. In this case, the metal foam body that is formed of the iron-chrome-aluminum alloy is obtained by compensating concentrations of alloy elements between the semi-product and the powder by diffusion, and a content of chrome and aluminum in the metal foam is smaller than a content of chrome and aluminum included in a starting alloy of the used powder.

8 Claims, 1 Drawing Sheet

(52) U.S. Cl.
CPC .............. *C22C 38/06* (2013.01); *B22F 3/1021* (2013.01); *B22F 2998/10* (2013.01); *Y10T 428/12479* (2015.01)

(56) References Cited

U.S. PATENT DOCUMENTS

| | | | |
|---|---|---|---|
| 5,582,867 A * | 12/1996 | Tsubouchi | C23C 10/56 427/253 |
| 6,387,149 B1 | 5/2002 | Harada et al. | |
| 6,926,969 B2 * | 8/2005 | Bohm | B01D 39/2034 419/2 |
| 2006/0280637 A1 * | 12/2006 | Naumann | B22F 7/006 419/2 |
| 2007/0243444 A1 | 10/2007 | Zheng et al. | |
| 2008/0118387 A1 | 5/2008 | Demetriou | |
| 2008/0171218 A1 | 7/2008 | Naumann et al. | |
| 2009/0042080 A1 | 2/2009 | Glatz et al. | |

* cited by examiner

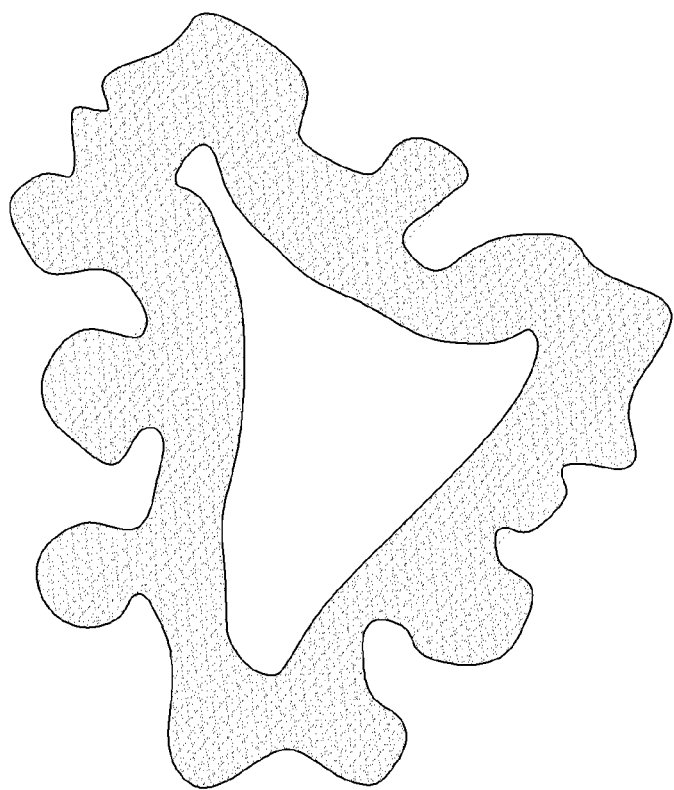

OPEN-POROUS METAL FOAM BODY AND A METHOD FOR FABRICATING THE SAME

CROSS-REFERENCE TO RELATED APPLICATION

This application is a Divisional Application of U.S. patent application Ser. No. 13/197,867, which was filed on Aug. 4, 2011, which claims priority to and the benefit of Korean Patent Application No. 10-2010-0077032 filed in the Korean Intellectual Property Office on Aug. 10, 2010, the entire contents of which are incorporated herein by reference.

BACKGROUND OF THE INVENTION (a) Field of the Invention

The present invention relates to a metal foam, and more particularly, to an open-porous metal foam.

(b) Description of the Related Art

A metal foam may be used in various fields due to a low weight and porosity. Particularly, the metal foam may be catalytically activated for the purpose of a chemical process or may be used in an environmental engineering, and may be used for the purpose of filtration.

In addition, the metal foam is frequently used at a relatively high temperature and a severe environment. In this case, the metal foam should endure the high temperature of 700° C. or more, and particularly, even the temperature at which it is difficult to make most metals and metal alloys stable for a long time such as the high temperature of 1000° C. or more.

The metal foam is advantageous in that the metal foam is applied for the purpose of high temperature as compared to a general heat resistant metal or heat resistant metal alloy in terms of manufacturing costs.

Meanwhile, the metal foam may be manufactured by various methods. In the related art, a cost may be more reduced by sintering a green body manufactured in a powder form by using each metal.

However, all characteristics required in the completed metal foam cannot be satisfied by only a sintering process.

Accordingly, it is known that the surface of the metal foam is subsequently coated and reformed. This is required in a metal foam that is generally formed of nickel.

In the related art, an open-porous shaped body that is coated by another metal formed of nickel or iron, and a mixed crystal of at least iron or nickel, or an intermetallic phase is disclosed.

The completed open-porous shaped body is formed of at least two phases having different thermal, mechanical and chemical characteristics.

In addition, in the related art, the use of the metal foam formed of an iron-chrome-aluminum alloy is disclosed, and a metal oxide layer acting as a catalyst is formed on the metal foam. However, the used alloy is not disclosed in detail, and a ratio at which each metal is included in the alloy and a manufacturing process of the metal foam are not disclosed.

In addition, particularly, it is impossible or very difficult to sinter the alloys including aluminum in a relatively higher ratio.

The above information disclosed in this Background section is only for enhancement of understanding of the background of the invention and therefore it may contain information that does not form the prior art that is already known in this country to a person of ordinary skill in the art.

SUMMARY OF THE INVENTION

The present invention has been made in an effort to provide an open-porous metal foam that has improved material characteristics as compared to a known metal foam, and particularly, is used at a higher temperature and is stable to oxidation.

An exemplary embodiment of the present invention provides an open-porous metal foam made of an iron-based alloy including 15 wt % or more of chrome and 5 wt % or more of aluminum.

A web element of the foam is formed in an air-tight manner.

The iron-based alloy includes nickel, and a maximum content of nickel is maintained so as to have an alpha ($\alpha$)-structure in a structure.

In the open-porous metal foam according to the exemplary embodiment of the present invention, a specific surface area is 10 $mm^2/mm^3$ to 25 $mm^2/mm^3$, and surface roughness of the web element facing an open pore is 50 µm to 200 µm.

In the open-porous metal foam, at least one alloy element selected from yttrium (Y), hafnium (Hf), manganese (Mn), silicon (Si) and zirconium (Zr) is included in an amount of greater than 0 wt % to less than 1 wt %.

Another exemplary embodiment of the present invention provides a method for manufacturing an open-porous metal foam, including: providing a semi-product that does not include chrome and aluminum or include a smaller amount than an amount in powder of an iron-chrome-aluminum alloy and is formed of iron or an iron-based alloy; uniformly coating a surface and an opened pore of the semi-product that is formed of the iron or the iron-based alloy with the powder of the iron-chrome-aluminum alloy and an organic binding agent; discharging organic components by heat treating the semi-product that is formed of the coated iron or iron-based alloy under a reducing atmosphere at a temperature of 300 to 600° C.; and sintering the semi-product that is formed of the iron or the iron-based alloy from which the organic components are discharged at the temperature of 900° C. or more.

The semi-product uses a foam in which the iron or the iron-based alloy is deposited on the organic open-porous foam by an electroplating manner.

An average particle size of the powder is 20 µm to 50 µm.

When the sintering is performed, the metal foam that is formed of the iron-chrome-aluminum alloy is formed by compensating concentrations of alloy elements between the semi-product and the powder by diffusion, and a content of chrome and aluminum in the metal foam is smaller than a content of chrome and aluminum included in a starting alloy of the used powder.

The sintering is heated at a heating speed of 5 K/min to 1300° C., and the temperature is maintained for at least 30 min.

According to exemplary embodiments of the present invention, since an open-porous metal foam is formed of a single-phase material, the foam has uniform thermal, mechanical and chemical characteristics, excellent malleability and low brittleness.

In addition, an anti-aging property may be improved by forming a protective aluminum oxide layer by preliminary oxidation in the air.

BRIEF DESCRIPTION OF THE DRAWINGS

FIG. 1 is a transverse cross-sectional view that illustrates an extended surface of a web element (factor) of a metal foam according to an exemplary embodiment of the present invention.

DETAILED DESCRIPTION OF THE EMBODIMENTS

Advantages and features of the present invention and methods to achieve them will be elucidated from exemplary embodiments described below in detail with reference to the accompanying drawings. However, the present invention is not limited to exemplary embodiment disclosed herein but will be implemented in various forms. The exemplary embodiments are provided by way of example only so that a person of ordinary skill in the art can fully understand the disclosures of the present invention and the scope of the present invention. Therefore, the present invention will be defined only by the scope of the appended claims. Like reference numerals designate like elements throughout the specification.

Hereinafter, referring to the drawings, an open-porous metal foam according to an exemplary embodiment of the present invention will be described. For reference, in the description of the present invention, in the case where it is deemed that a detailed description of related known functions or constitutions may unnecessarily cloud the gist of the present invention, the detailed description thereof will be omitted.

An open-porous metal foam according to an exemplary embodiment of the present invention is made of an iron-based alloy including 15 wt % or more of chrome and 5 wt % or more of aluminum.

Corrosion resistance and high temperature oxidation resistance under various atmospheres may be provided by including chrome (Cr) in the iron-based alloy.

In addition, oxides of aluminum may be formed on a surface of an iron-based alloy under the environment that is exposed to the high temperature by including aluminum (Al) in the iron-based alloy.

It is more preferable that 20 wt % or more of chrome and 6 wt % or more of aluminum are included in the iron-based alloy for the high temperature oxidation resistance.

As the iron-based alloy in which chrome and aluminum are included, Fecr alloy may be used.

When the metal foam is manufactured, the open-porous metal foam may be used as a semi-product that is formed of iron or an iron-based alloy. The alloy may not include chrome and aluminum, or the content of at least chrome and aluminum may be smaller than the content of chrome and aluminum included in the powder used in another manufacturing method.

The surface and the open pore of the semi-product are uniformly coated with a suspension solution formed by the powder of the iron-chrome-aluminum alloy and the organic binding agent.

After the semi-product on which the suspension solution is coated is dried, and the organic components are first discharged at the temperature of 300° C. to 600° C. in the heat treatment under a reducing atmosphere.

Next, the sintering process is performed at the temperature of 900° C. or more. In this case, the metal foam body that is formed of the iron-chrome-aluminum alloy is formed by compensating concentrations of alloy elements between the semi-product and the powder by diffusion when sintering, and a content of chrome and aluminum in the metal foam is smaller than a content of chrome and aluminum included in a starting alloy of the used powder.

The alloy in a the powder state and a volume thereof may be selected so that desired contents of alloy elements are included in the completed metal foam, in consideration of the material volume of the semi-product and an alloy composition thereof in the case of the iron-based alloy.

By starting from a starting alloy of the powder, "dilution" is implemented by diffusion of the alloy elements in the sintering, and as a result, each content thereof is smaller than that of the powder alloy.

Nickel may be included in addition to iron in the material of the semi-product. In this case, the maximum content of nickel in the iron-based alloy should be selected so as to have an alpha ($\alpha$)-structure in the structure frame. However, in respects to the gamma ($\gamma$)-structure, a smaller content is allowed.

As a result, the general maximum content of nickel may be 5 wt %.

The alpha ($\alpha$)-structure in the structure frame very preferably acts to form a protective oxide layer in the heat treatment performed under an oxidizing atmosphere after the sintering process, particularly, in diffusion of elements such as aluminum.

As described above, the compensation of the concentration between the semi-product material and the powder alloy in the sintering is simplified and accelerated by improving the diffusion.

It is preferable that all web elements of the foam are formed in an air-tight manner. This may be implemented by using the foam in which the iron or the iron-based alloy is deposited on the organic open-porous foam body as the semi-product.

In the metal foam according to the exemplary embodiment of the present invention, a specific surface area may be 10 $mm^2/mm^3$ to 25 $mm^2/mm^3$, and surface roughness of the web elements (factors) facing an open pore may be in the range of 50 µm to 200 µm.

In the completed material for forming the metal foam according to the exemplary embodiment of the present invention, other alloy elements may be included in a content of greater than 0 wt % to less than1 wt %. This element may be at least one selected from yttrium (Y), hafnium (Hf), manganese (Mn), silicon (Si) and zirconium (Zr).

A method for manufacturing an open-porous metal foam according to another exemplary embodiment of the present invention includes providing a semi-product that does not include chrome and aluminum or include a smaller amount than an amount in powder of an iron-chrome-aluminum alloy and is formed of iron or an iron-based alloy; uniformly coating a surface and an opened pore of the semi-product that is formed of the iron or the iron-based alloy with the powder of the iron-chrome-aluminum alloy and an organic binding agent; discharging organic components by heat treating the coated semi-product that is formed of iron or iron-based alloy under a reducing atmosphere at a temperature of 300 to 600° C.; and sintering the semi-product that is formed of the iron or the iron-based alloy from which the organic components are discharged at the temperature of 900° C. or more.

In the case of the exemplary embodiment of the present invention, when the open-porous metal foam is manufactured, and in order to manufacture the suspension solution for coating the surface of the semi-product, the powder having the average particle size of 20 µm to 50 µm may be used.

In addition, in the sintering for manufacturing the metal foam, heating may be performed at a heating speed of 5 K/min to the maximum temperature of 1300° C., and the maximum temperature may be maintained for at least 30 min and preferably, 60 min.

In the exemplary embodiment of the present invention, the concentration compensation is very preferably implemented between the metal elements included in the semi-product material and the metal elements included in the powder alloy by diffusion implemented for a short time in the sintering.

Thereby, the sintering may be accelerated and a requiring time may be shortened. The concentration compensation of the alloy elements is implemented by diffusion.

The metal alloy of the completed metal foam is uniform over the entire volume and has resistance to the high temperature oxidation.

The air-tight web element (factor) for forming the support structure frame has increased mechanical strength. The surface on which the suspension solution including the powder is provided is a rough surface corresponding to a shape of powder particles. Therefore, the specific surface area of the metal foam may be increased, and fluidizing movement characteristics applied to various fields may be improved.

In addition, corrosion resistance may be improved because the foam is manufactured by only the sintering by the air-tight property of the web element of the metal foam as compared to the metal foam in which residual porosity cannot be avoided.

According to the exemplary embodiment of the present invention, since a metal foam is formed of a single-phase material, the foam has uniform thermal, mechanical and chemical characteristics, excellent malleability and low brittleness.

In addition, a protective aluminum oxide layer for increasing an anti-aging property may be formed by preliminary oxidation in the air.

Hereinafter, the present invention will be described in more detail with reference to Examples.

EXAMPLE

When the open-porous metal foam was manufactured, first, the semi-product that was formed of the iron-based alloy including 5% of nickel on the organic foam that was formed of polyurethane by the electroplating method was used.

Porosity was 94%. The dimension of width L*length B*thickness T was 300 mm*200 mm*1.5 mm.

In order to manufacture the metal foam, 50 g of the metal powder of the iron-chrome-aluminum alloy including 35 wt % of chrome and 9.5 wt % of aluminum was used. In addition, 50 ml of 1% polyvinylpyrrolidone aqueous solution was manufactured.

An excessive organic binding agent was removed from the pores by spraying this aqueous solution on the semi-product provided as the metal foam, and pressing the solution in respects to the absorptive prop.

As a result, only the web element surfaces of the open-porous structure frame of the semi-product were wet, but the pores were not filled.

Subsequently, the semi-product processed as described above was fixed into the vibration device, and the metal powder was scattered on the surface thereof. The metal powder was uniformly distributed in the porous net and on the web factor surfaces by vibration, and as a result, the open-porous was maintained while the entire web element surface was completely covered with the powder particles.

As described above, the pretreated semi-product was heat treated under the hydrogen atmosphere. In this case, the temperature was increased at the heating speed of 5 K/min. As a result, the organic components were discharged in the temperature range of 300 to 600° C.

The sintering temperature for the sintering process was set to the temperature of 900° C. The temperature was maximally increased to 1300° C., and maintained for 60 min.

In this case, the alloy elements of the used powder were diffused into the material of the semi-product, that is, the web element of the semi-product until the complete compensation of the element concentration was implemented.

As described above, the completed open-porous metal foam was formed of the iron-chrome-aluminum alloy including 22 wt % of chrome, 6 wt % of aluminum and less than 3 wt % of nickel in addition to iron.

The content of oxygen was less than 0.2 wt %, which was very slight, and the content of hydrogen was 0.05 wt %, which was very low. The metal foam had the porosity of 91%, and the web factors had the air-tight property.

The metal foam had the oxidation resistance at the temperature of 1100° C. or less in the air.

Since the content of hydrogen was very low, there was no formation of carbide acting as the hindrance factor.

FIG. 1 is a transverse cross-sectional view that illustrates a surface of a web element of a metal foam manufactured as described above. Through FIG. 1, it could be confirmed that the surface at the cavity of the web factor, which was not changed by the manufacturing process according to the exemplary embodiment of the present invention in the art was smooth and had very low surface roughness.

On the other hand, the external surface of the web element became rougher by the sintered powder particles thereon. The recesses between adjacent particles had the depth of 50 μm to 200 μm. In this case, the densities of the materials were the same and uniform over the entire web factor volume.

The exemplary embodiment of the present invention may provide an open-porous metal foam that has improved thermal, mechanical and chemical characteristics, and particularly, may provide an open-porous metal foam body that is used at a higher temperature and is stable to oxidation.

Having generally described this invention, a further understanding can be obtained by reference to certain specific examples which are provided herein for purposes of illustration only and are not intended to be limiting unless otherwise specified.

Therefore, it is understood that the above exemplary embodiments are illustrative but are not limited. While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A method for manufacturing an open-porous metal foam, comprising:
   providing a semi-product that does not include chromium and aluminum or include a smaller amount than an amount in powder of an iron-chromium-aluminum alloy and is formed of iron or an iron-based alloy;
   uniformly coating a surface and an opened pore of the semi-product that is formed of the iron or the iron-based alloy with the powder of the iron-chromium-aluminum alloy and an organic binding agent;
   discharging excessive organic binding agent by heat treating the semi-product that is formed of the coated iron or iron-based alloy under a reducing atmosphere at a temperature of 300 to 600° C.; and
   sintering the semi-product that is formed of the iron or the iron-based alloy from which the excessive organic binding agent are discharged at the temperature of 900° C. or more.

2. The method of claim 1, wherein:
   the semi-product is a foam which is formed by depositing the iron or the iron-based alloy on an organic open-porous foam by an electroplating manner.

3. The method of claim 2, wherein:
   an average particle size of the powder is 20 μm to 50 μm.

4. The method of claim 2, wherein:

heated at a heating speed of the sintering is 5 K/min to a temperature of 1300° C., and the temperature is maintained for at least 30 min.

5. The method of claim 1, wherein:

an average particle size of the powder is 20 μm to 50 μm.

6. The method of claim 1, wherein:

when the sintering is performed, a metal foam of the iron-chromium-aluminum alloy is formed by compensating concentrations of alloy elements between the semi-product and the powder by diffusion, and a content of chromium and aluminum in the metal foam is smaller than a content of chromium and aluminum included in a starting alloy of the used powder.

7. The method of claim 6, wherein:

a heating speed of the sintering is 5 K/min to a temperature of 1300° C., and the temperature is maintained for at least 30 min.

8. The method of claim 1, wherein:

heated at a heating speed of the sintering is 5 K/min to a temperature of 1300° C., and the temperature is maintained for at least 30 min.

\* \* \* \* \*